United States Patent Office 2,908,159
Patented Oct. 13, 1959

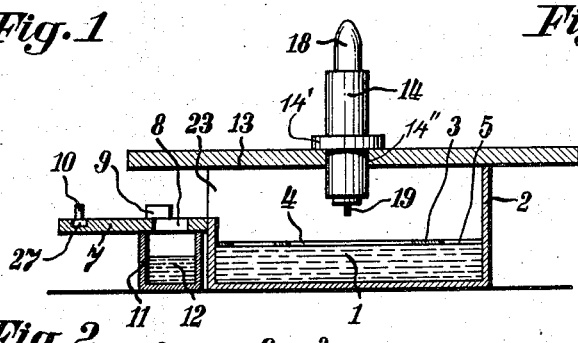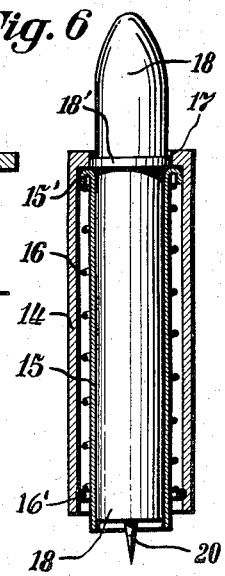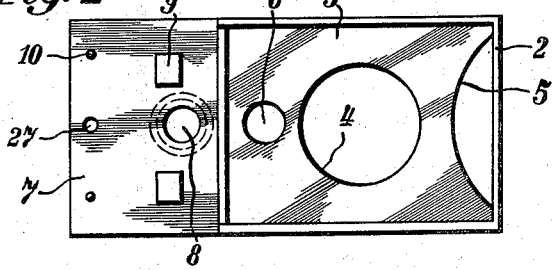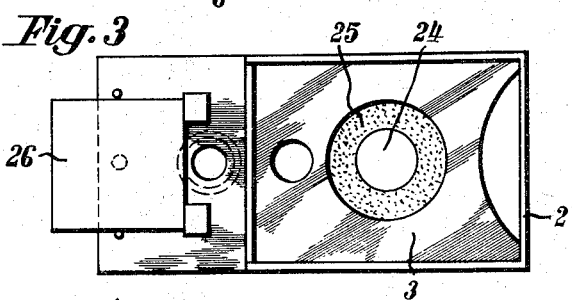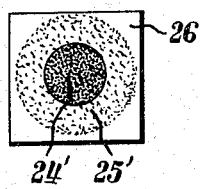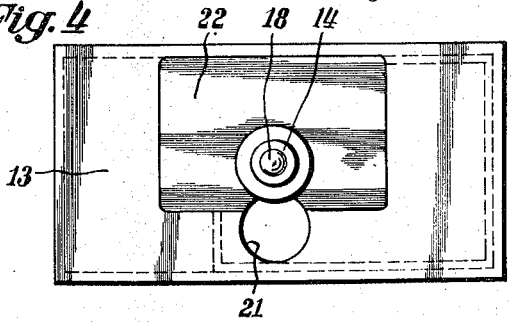

2,908,159

PROCESS AND DEVICE FOR MEASURING FATTY MATERIALS AND THE LIKE

Kurt Röth, Stuttgart-Mohringen, Germany

Application October 16, 1957, Serial No. 690,546

11 Claims. (Cl. 73—53)

The present invention relates to quantitative determining and measuring of amounts of materials, such as fatty materials, skin secretions and the like, which are capable of reacting physically or interfacially with a liquid such as oil. For example, such a material may be in the form of secretory specimen or material derived from the skin of a human being.

One of the primary objects of the present invention is to provide means affording accurate quantitative determination or measurement of a material of the above type.

Another object of the present invention is to provide means eliminating in the course of performing the measurement factors which might reduce the accuracy of the measurement.

A further object of the present invention is to provide means rendering it possible to make a series of measurements in rapid succession without sacrificing accuracy.

An additional object of the present invention is to provide means enabling each measurement to be carried out quickly and conveniently while reducing to a minimum the possibility of rendering the measurement inaccurate due to lack of skill of the operator.

The above and other objects of the invention will become further apparent from the following detailed description, reference being made to the accompanying drawing showing a preferred embodiment of the invention.

In the drawing:

Fig. 1 is a longitudinal, sectional, elevational view of a device according to the present invention;

Fig. 2 is a top plan view of the structure of Fig. 1 with a slide plate thereof omitted;

Fig. 3 shows the structure of Fig. 2 provided with a copy sheet and with the spot to be measured;

Fig. 4 is a top plan view of the structure of Fig. 1 including the slide plate thereof;

Fig. 5 illustrates how a copied spot appears on the copy sheet; and

Fig. 6 is an enlarged, sectional, elevational view of a means for interchangeably receiving and supporting for vertical movement a plurality of instruments one of which is shown in Fig. 6.

According to the invention, a liquid of relatively high surface tension, such as water 1, for example, is located within an upright container 2 having an open top and preferably made of a transparent or translucent material. A member in the form of a thin float plate 3 is placed on the surface of the liquid 1 to float thereon, this float plate having a construction similar to a template. The float plate 3 floats on the liquid 1 either because the mass of the float plate 3 has a lower specific weight than the liquid 1, or because it is rendered floatable by little float members or the like, or because it presents a hydrophobic surface which prevents it from pressing or submerging into the tensioned surface of the liquid 1.

In the illustrated example the float plate 3 is formed with a cutout 4, which is preferably circular, and a peripheral portion of the float plate is formed with a second cutout 5 wider than the cutout 4 and laterally displaced therefrom. For control purposes the float plate 3 is also provided adjacent the cutout 4 with an additional cutout 6 smaller than the cutout 4.

A small platform 7 is located adjacent the left side wall of container 2, as viewed in Figs. 1–3. The platform 7 is provided with an aperture 8 and carries a plurality of stops 9 and 10 which extend upwardly from the top surface of platform 7.

A small receptacle 11, which has an open top, is located beneath and accessible through the aperture 8. In the illustrated example the platform 7 is connected to the top of receptacle 11 so that the latter supports the platform 7. The receptacle 11 and container 2 rest on any suitable support, such as a table top or like. The receptacle 11 is adapted to contain a supply of liquid 12, e.g. in the form of oil, which is capable of forming a continuous layer spread out and floating on the surface of the water 1.

Slide means in the form of a slide plate 13 is located over and shiftable with respect to the top of the container 2. In the illustrated example the slide plate 13, which also is preferably made of a transparent or translucent material, rests on the top of the container 2 and is slidable to the left and right, as viewed in Figs. 1 and 4, on the top of the container 2. Known stops which are not illustrated in the drawing may be provided for determining end positions of the slide plate 13.

Means may be provided for interchangeably receiving and for supporting for vertical movement on slide plate 13 a plurality of instruments. This means in the illustrated example includes a vertical guide sleeve 14 (Figs. 1 and 6). Sleeve 14 has a collar 14' fixed thereto and resting on the upper surface of the slide plate 13, as shown in Fig. 1. The portion of the sleeve 14 beneath collar 14' extends through and downwardly beyond an aperture 14" formed in the slide plate 13 substantially at the center thereof.

As may be seen from Fig. 6, a second sleeve 15 is located within the sleeve 14, and this sleeve 15 has its upper end 15' curved outwardly and turned upon itself for slidably engaging the inner surface of the sleeve 14. The inner diameter of the sleeve 15 is smaller than the diameter of an opening 17 formed in a top wall of the sleeve 14 to prevent the sleeve 15 with its end surface 15' from extending beyond the edge of opening 17. A coil spring 16 is placed about the sleeve 15 in the inner space between the latter and the sleeve 14. This spring 16 abuts at its bottom end against a snap ring 16' located in a groove formed in the interior of sleeve 14 adjacent its bottom end, and the spring 16 abuts with its top end against the outwardly curved end 15' of sleeve 15 so that the latter is urged upwardly to the position shown in Fig. 6 by spring 16.

A plurality of elongated, pencil-like instruments 18 is adapted to be interchangeably received in the sleeve 15. Each instrument 18 has a collar 18' fixed thereto, and this collar has an outer diameter which is not greater than the diameter of opening 17 while being greater than the inner diameter of sleeve 15, which slidably receives each instrument 18, so that the collar 18' rests upon the upper end surface of the sleeve 15.

By pressing a finger downwardly on the instrument 18 the operator can depress the latter together with the sleeve 15 against the force of the spring 16 and with respect to the guide sleeve 14 and the slide plate 13. The return or upward movement of the instrument is produced automatically by spring 16 when the operator releases the instrument.

The instrument 18 which is shown in Fig. 1 carries at its bottom end a small pin 19 having, for example, a bottom end surface of circular configuration. Fig. 6 shows an instrument 18 which differs from that of Fig. 1 only in that instead of a pin 19 the instrument 18 of Fig. 6 carries at its bottom end a pin 20 terminating in a sharp point.

As may be seen from Fig. 4, the slide plate 13 is formed, in front of the guide sleeve 14, with a viewing aperture 21. Also, the slide plate 13 is provided at the shaded area 22 which is shown in Fig. 4 with a matted region providing a particularly good observation of the manner in which the process is carried out.

When the slide plate 13 rests directly on the top of the container 2, as in the illustrated example, then the left wall of the container 2, as viewed in Fig. 1, has an upper edge portion terminating at an elevation lower than the top of the container 2 to provide a passage 23 through the left of the container 2. The lower portion of means 14—16 together with an instrument carried thereby are freely movable through passage 23 during sliding of the slide plate 13.

It is apparent that the above-described structure may be located in a special housing and that this housing may be provided with a guiding structure to support the slide plate 13 for sliding movement in its own plane. Also, the slide plate 13 may be supported for turning movement about one of its longitudinal edges. Such obvious further embodiments of the invention are not illustrated in the drawing.

A process according to the invention, which may be carried out with the above-described structure, is as follows:

After the liquid 1 is located in the container 2, the float plate 3 is placed on the surface of the liquid 1 so as to float thereon. As is apparent from Figs. 2 and 3, the outer periphery of the float plate 3 has a configuration substantially the same as that of the cross section of the interior of the container 2 in a plane parallel to the slide plate 13, so that the periphery of the plate 3 slidably engages the inner surfaces of the container side walls which thus prevent shifting of the plate 3 on the liquid 1.

With the plate 3 resting on the liquid 1 the slide plate 13 is placed on the top of the container 2 and with the instrument 18 of Fig. 1 carried by the means 14—16 the plate 13 is shifted to the left from the position thereof shown in Fig. 1 until the instrument 18 of Fig. 1 is located over the opening 8. The operator now moves the instrument 18 downwardly so as to bring the pin 19 in contact with the oil 12, and then the operator releases the instrument 18 so that it moves up to its rest position. The slide plate 13 is now returned to its end position shown in Fig. 1, and in this position the axis of the instrument 18 passes through the center of the cutout 4. The operator now depresses the instrument 18 so as to place the oil film on the pin 19 in contact with the surface of the liquid 1 at a part of this surface accessible through the cutout 4. The instrument is then released and the oil deposited on the liquid 1 spreads out and forms a continuous layer floating on the liquid 1 within the cutout 4.

Now the instrument 18 shown in Fig. 1 is removed from means 14—16. An identical instrument with an absolutely clean pin 19 is placed with the end face of pin 19 for a short time against a portion of the skin of a human being, for example, which is to be tested, so that secretions and like secretory material at such a skin portion remain on and adhere to the pin 19 when it is removed from the skin. This instrument is now placed in the sleeve 15, and while the slide plate 13 remains in the position of Fig. 1, the instrument is depressed by the operator until the bottom end of the pin 19 engages the layer of oil floating on the liquid 1 at the cutout 4. The instrument 18 is now released, and said material which has been transferred from the pin 19 to the layer of oil spreads out and forms a spot 24 shown in Fig. 3. The layer of oil is displaced laterally by the spot 24 and forms a ring 25, for example, shown in Fig. 3 surrounding the spot 24.

It is apparent that the spot 24 will not always form a circle and will not always be concentric with the cutout 4.

The last-mentioned instrument is removed from the means 14—16 and is replaced by the instrument 18 shown in Fig. 6.

In the meantime, a piece of paper forming a copy sheet 26 (Fig. 3), or a piece of another sheet material of suitable properties, is placed on the platform 7 with its right edge engaging the stops 9 and with its front and rear edges located between and respectively engaging the stops 10, as shown in Fig. 3, so that the position of the copy sheet 26 is accurately determined by these stops. The copy sheet 25 may be made of a piece of so-called millimeter paper, although the copy sheet may also be provided with any other type of graduations printed thereon.

Just beneath the center of the copy sheet 26 the platform 7 is formed with a small recess or aperture 27. With the instrument 18 of Fig. 6 carried by means 14—16 and with the slide plate 13 shifted to the left from the position of Fig. 1 to a position which locates the axis of instrument 18 passing through the center of recess 27, the operator depresses the instrument 18 so that the pin 20 pierces the sheet 26. Upon release of the instrument 18 the spring 16 moves the instrument back to its rest position, and the copy sheet 26 remains frictionally in engagement with the pin 20 to move upwardly therewith so that the copy sheet 26 is now engaged and carried by the instrument.

Now the operator returns the slide plate 13 to the position thereof shown in Fig. 1, so that the copy sheet 26 is located over the cutout 4. The operator now depresses the instrument together with the copy sheet 26 so that the lower surface thereof contacts the spot 24, and in this way a copy 24' (Fig. 5) of the spot 24 is transferred to the copy sheet 26. Upon release of the instrument 18, 20, the latter returns to its rest position, and the operator may raise the slide plate 13 to remove the copy sheet 26 from the pin 20.

Fig. 5 shows, in addition to the spot copy 24' on the sheet 26, a copy 25' of the ring 25. This copy of the ring 25 is not essential, however.

It is apparent that where the sheet 26 is in the form of millimeter paper, for example, the number of squares covered by the spot copy can easily be determined so that in this way the area of the copy of the spot may be measured. By comparison of this area with the area of the copy of a spot obtained under ideal or normal conditions of the tested material, the desired information with respect to the tested material may be obtained.

In order to provide a distinct, clearly visible copy 24', the liquid 1 may have dissolved therein a water-soluble coloring medium, in the form of ink, for example, so that the spot which becomes clearly perceivable to the operator's eye with respect to liquid 1 will be quite distinct. Some of the coloring medium from liquid 1 may somewhat adhere to the underface of the spot thereafter transferred to copy 24' and thus enhances the aforesaid distinction. The several stages of the process can be accurately and conveniently followed and observed through the viewing aperture 21.

Because the slide plate 13 in the illustrated example covers the container 2, disturbing agitation such as wave movements or the like of the liquid 1 or the layer of oil thereon are prevented, since air currents may not have ready access to the interior of the covered container.

It will be noted that the finger of the operator can directly engage the top rim of the guide sleeve 14 after the instrument 18 has been depressed sufficiently, so that the operator need only apply the ball of a finger to the top of the instrument 18. This feature also contributes to the accuracy of the process.

Instead of determining the area of the spot copy 24' by using millimeter paper, the size of the copy may be determined by comparing the spot copy with a table having circles of different areas thereon.

All of the copies obtained during a series of tests may be preserved in dry condition without any further processing.

In order to render the device immediately available for another test after the completion of one test, the slide plate 13 is removed or tilted upwardly, and a wiper, which may be in the form of a rectangular sheet of paper, is moved by the operator over the member 3. This wiper engages the layer of oil 25 which clings to the wiper and moves with the latter away from the surface of the water 1 at the cutout. The operator moves the wiper to the cutout 5 where the previously used layers of oil accumulate. After this cleaning of the surface of water 1 at the cutout 4, the device is ready for use.

When it is desired to control the process by checking whether all of the fatty or secreted material on the pin 19 has been transferred to the layer of oil, use may be made of the cutout 6. A layer of oil may be located on the surface of the water at the cutout 6 in the same way as on the surface of water at the cutout 4. After the spot 24 has been provided on the layer of oil at the cutout 4, the slide plate 13 is shifted to the left so as to locate over the cutout 6 the pin 19 which has just transferred the material to be tested to the cutout 4.

The operator now depresses the instrument 18, 19 so that the pin 19 engages the layer of oil in the cutout 6. If another spot is formed in the cutout 6, then it is known that not all of the material to be tested was transferred from the pin 19 to the layer of oil at the cutout 4.

In order to guarantee that the end of the pin 19 is always applied against the surface or skin to be tested with the same pressure, this pin 19 may be resiliently mounted so that, when it engages the skin or the like, it moves yieldably into the instrument until the bottom end face of the latter which surrounds pin 19 engages the skin or surface to be tested. By resiliently mounting the pin 19 for such yieldable movement into the instrument and by always moving the pin against the force of the spring into the instrument until the end face of the latter surrounding the pin 19 engages the skin or surface to be tested, the application of the pin 19 to the area to be tested with the same pressure during a series of tests is guaranteed.

Thus, it will be seen that according to the invention a process is provided according to which an amount of material capable of reacting interfacially with a first liquid such as oil may be quantitatively measured. This first liquid is placed on a surface of a second liquid such as water on which the first liquid floats and spreads out to form a continuous layer. The amount of material to be measured is placed on the surface of the floating layer so that this material spreads out to form a spot.

Then there is placed in contact with this spot a surface of a copy sheet capable of having a copy of the spot transferred thereto upon contact with the spot, so that the size of the copied spot on the copy sheet may be determined after the copy sheet is removed from the spot.

The device, an example of which has been described above, for carrying out the process includes a container which has an open top and which receives the second liquid such as water on which the first liquid such as oil floats in the form of a layer. A member such as the float plate 3 is adapted to float on the second liquid (water) and is formed with a cutout such as the circular cutout 4 through which the surface of the second liquid is accessible and through which the layer of the first liquid (oil) is transferred for floating on the second liquid. The amount of material to be measured can then be placed on this layer by being moved into the cutout to contact the layer. A slide means in the form of the slide plate 13 is located over and shiftable with respect to the container top, and a means which may take the form of elements 14—16 is provided for interchangeably receiving and supporting for vertical movement on the slide means a pair of instruments such as the instrument 18, 19 for respectively depositing the first liquid on the second liquid and the amount of material to be measured on the first liquid and an additional instrument for carrying the copy sheet.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In the process for quantitatively measuring an amount of a material capable of reacting interfacially with a first liquid; the steps of placing said first liquid on the surface of a second liquid on which said first liquid floats and spreads out to form a continous layer, placing said amount of material on the surface of said layer so that said material spreads out to form a spot, and placing in contact with said spot a surface of a copy sheet capable of having a copy of said spot transferred thereto upon contact with said spot, whereby the size of the copied spot on said copy sheet may be determined after said copy sheet is removed from said spot.

2. In a process for quantatively determining an amount of a secretory and like material capable of reacting interfacially with a first liquid; the steps of placing said first liquid on the surface of a second liquid on which said first liquid floats and spreads out to form a continuous layer in which second liquid a coloring medium is contained, placing said amount of material on the surface of said layer, so that said material spreads out to form a spot perceivable through said coloring medium in said second liquid, and then bringing said spot in contact with the surface of a copy sheet capable of having a copy of said spot transferred thereto upon contact with said spot, whereby the size of the copied spot on said copy sheet may be determined after said copy sheet is removed from said spot.

3. A device for quantitatively measuring an amount of a material capable of reacting interfacially with a first liquid; comprising a container for receiving a second liquid which is adapted to carry floating at its surface a layer of said first liquid, said container having an open top, a member adapted to float on said second liquid and formed with a cutout through which the surface of said second liquid is accessible and through which said first liquid is transferred for floating in the form of a layer on said second liquid, whereby said amount of said material may be placed on said layer of said first liquid to form a spot a copy of which can be transferred by contact with a sheet and measured on the sheet, slide means located over and slidable with respect to said container top, and means for interchangeably receiving and supporting on said slide means, for vertical movement, a pair of instruments for respectively depositing said first liquid on said second liquid and said amount of said material on said first liquid, and an additional instrument for engaging and carrying a copy sheet capable of having a copy of said spot transferred thereto upon contact with said spot.

4. A device according to claim 3, including a platform for holding said copy sheet ready to be engaged and carried by said additional instrument when the latter is supported on said slide means, said platform being located adjacent said container and beneath said slide means during at least part of the movement thereof with respect to said container top, so that said additional instrument upon sliding of said slide means may be located over a copy sheet on said platform to move down to and engage said copy sheet.

5. A device according to claim 4, said additional instrument being provided at its bottom end with a pin terminating at its lower end in a pointed tip which pierces the copy sheet when said additional instrument is over the latter and moved downwardly to the same, so that said additional instrument may then be raised together with the copy sheet and shifted with said slide means to a position over said spot where said additional instrument may be lowered to place said copy sheet in contact with said spot.

6. A device according to claim 3, including a receptacle having an open top for receiving said first liquid, said receptacle being located adjacent said container in a position beneath one of said pair of instruments at a given position of said slide means, so that said one instrument may be lowered into contact with said first liquid in said receptacle to engage said first liquid, may then be raised upwardly with a film of said first liquid from said receptacle, and upon sliding of said slide means may then be located over said cutout of said member and moved downwardly for placing said first liquid on said second liquid.

7. A device according to claim 3, said slide means engaging said container at the top thereof to cover said container and prevent agitation of liquids therein by air currents.

8. A device according to claim 3, said slide means being formed with a viewing aperture adjacent said means for supporting said instruments.

9. A device according to claim 3, said container and slide means being transparent.

10. A device according to claim 9, said slide means being matted adjacent said means for supporting said instruments.

11. A device for quantitatively measuring an amount of a material capable of reacting interfacially with a first liquid; comprising a container having an open top and a side wall having an upper edge portion at a lower elevation than said container top to provide a passage through said side wall, a slide plate resting on and slidable with respect to said container top, a float plate adapted to be located in said container floating on a second liquid therein, said float plate having a configuration substantially the same as the configuration of the cross section of the interior of said container in a plane parallel to said slide plate, so that said float plate will engage at its periphery the inner surfaces of the side walls of said container to be restrained by said side walls from shifting movement on the surface of said second liquid in said container, said float plate being formed with a cutout, means carried by said slide plate for interchangeably receiving and supporting for vertical movement a pair of instruments for respectively depositing at said cutout said first liquid on said second liquid to form on the latter a layer of said first liquid and said amount of said material on said layer of said first liquid at said cutout to form a spot of said material and an additional instrument for carrying a copy sheet for contacting said spot, and means adjacent said container and passage for supplying said first liquid to one of said pair of instruments and for supplying a copy sheet to said additional instrument, said slide plate sliding on said container top to move at one time said one instrument and at another time said additional instrument and a copy sheet carried thereby through said passage to a position over said cutout of said float plate.

References Cited in the file of this patent

UNITED STATES PATENTS 2,117,185   Lynskey _____ May 10, 1938

OTHER REFERENCES

Journal of the American Chemical Society, vol. 57, 1935, pages 1007–1022.